(12) United States Patent
Chen et al.

(10) Patent No.: US 11,545,103 B2
(45) Date of Patent: Jan. 3, 2023

(54) REFLECTIVE-TYPE DISPLAY SCREEN AND CONTROL METHOD THEREOF, AND DISPLAY DEVICE

(71) Applicants: BEIJING BOE OPTOELECTRONICS TECHNOLOGY CO., LTD., Beijing (CN); Beijing BOE Technology Development Co., Ltd., Beijing (CN)

(72) Inventors: Wei Chen, Beijing (CN); Yangheng Li, Beijing (CN); Bin Zhao, Beijing (CN); Xin Li, Beijing (CN); Yong Song, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/265,552

(22) PCT Filed: May 19, 2020

(86) PCT No.: PCT/CN2020/090951
§ 371 (c)(1),
(2) Date: Feb. 3, 2021

(87) PCT Pub. No.: WO2020/233555
PCT Pub. Date: Nov. 26, 2020

(65) Prior Publication Data
US 2021/0304695 A1 Sep. 30, 2021

(30) Foreign Application Priority Data
May 20, 2019 (CN) .......................... 201910417894.7

(51) Int. Cl.
*G02F 1/1335* (2006.01)
*G09G 3/36* (2006.01)
*G09G 5/10* (2006.01)

(52) U.S. Cl.
CPC ..... *G09G 3/3648* (2013.01); *G02F 1/133533* (2013.01); *G02F 1/133536* (2013.01); *G09G 5/10* (2013.01); *G09G 2330/023* (2013.01); *G09G 2360/141* (2013.01); *G09G 2360/144* (2013.01)

(58) Field of Classification Search
CPC .. G09G 3/3648; G09G 5/10; G09G 2330/023; G09G 2360/141;
(Continued)

(56) References Cited

U.S. PATENT DOCUMENTS 5,796,509 A * 8/1998 Doany ............. G02F 1/133603
359/254
7,248,235 B2 7/2007 Fujii et al.
(Continued)

FOREIGN PATENT DOCUMENTS

CN 1403856 A 3/2003
CN 1932597 A 3/2007
(Continued)

OTHER PUBLICATIONS

First office action issued in Chinese Patent Application No. 201910417894.7 with search report.

*Primary Examiner* — Yuzhen Shen
(74) *Attorney, Agent, or Firm* — Chiwin Law LLC

(57) ABSTRACT

A reflective-type display screen and a control method thereof, and a display device are provided. The reflective-type display screen comprises, a display panel, a compensation light source, a detector module and a processor module. The display panel comprises a reflection surface, the display panel is configured to reflect light by the reflection surface to realize display; the compensation light source
(Continued)

is in the display panel; the detector module is on a light-outputting side of the display panel and is configured to acquire an intensity of ambient light outside the display screen; and the processor module is respectively connected with the detector module and the compensation light source and is configured to control operation of the compensation light source based on the intensity of the ambient light acquired by the detector module.

14 Claims, 6 Drawing Sheets

(58) Field of Classification Search
CPC ............ G09G 2360/144; G09G 3/3406; G02F 1/133533; G02F 1/133536; G02F 1/133528
See application file for complete search history.

(56) References Cited

U.S. PATENT DOCUMENTS

| | | | |
|---|---|---|---|
| 2003/0052869 A1* | 3/2003 | Fujii | G02F 1/133555 345/204 |
| 2005/0041173 A1* | 2/2005 | Kubota | G02F 1/133611 349/61 |
| 2006/0007107 A1* | 1/2006 | Ferguson | G09G 3/3406 345/102 |
| 2009/0262288 A1* | 10/2009 | Tsuchiya | G02F 1/133555 349/114 |
| 2010/0156864 A1* | 6/2010 | Chae | G09G 3/3406 345/207 |
| 2013/0105668 A1 | 5/2013 | Ho et al. | |
| 2016/0260388 A1* | 9/2016 | Yata | G09G 3/3607 |
| 2017/0068362 A1* | 3/2017 | Den Boer | G09G 3/32 |

FOREIGN PATENT DOCUMENTS

| | | |
|---|---|---|
| CN | 101833198 A | 9/2010 |
| CN | 102045525 A | 5/2011 |
| CN | 102402095 A | 4/2012 |
| CN | 105974697 A | 9/2016 |
| CN | 108052898 A | 5/2018 |
| CN | 108061988 A | 5/2018 |
| CN | 108196398 A | 6/2018 |
| CN | 109638047 A | 4/2019 |
| CN | 109976030 A | 7/2019 |

* cited by examiner

REFLECTIVE-TYPE DISPLAY SCREEN AND CONTROL METHOD THEREOF, AND DISPLAY DEVICE

This application is a U.S. National Phase Entry of International Application No. PCT/CN2020/090951 filed on May 19, 2020, designating the United States of America and claiming priority to Chinese Patent Application No. 201910417894.7, filed on May 20, 2019. The present application claims priority to and the benefit of the above-identified applications and the above-identified applications are incorporated by reference herein in their entirety for all purposes.

TECHNICAL FIELD

Embodiments of the present disclosure relate to a reflective-type display screen and a control method thereof, and a display device.

BACKGROUND

Because a reflective-type display screen does not need an external light source, the reflective-type display screen has many advantages, such as cost saving, power saving, eye protection, etc. Therefore, the reflective display screen is widely used in electronic strip label (ESL), small game machines, smart watches and other fields. However, the biggest problem of reflective display screen is that it requires high intensity of ambient light. If the ambient light is weak, the reflective display screen is easy to display unevenly or display a dark image. Therefore, there is still much room for improvement in the design of reflective display screen.

SUMMARY

At least one embodiment of the present disclosure provides a reflective-type display screen, the reflective-type display screen comprises: a display panel, a compensation light source, a detector module and a processor module. The display panel comprises a reflection surface, the display panel is configured to reflect light by the reflection surface to realize display; the compensation light source is in the display panel; the detector module is on a light-outputting side of the display panel and is configured to acquire an intensity of ambient light outside the display screen; and the processor module is respectively connected with the detector module and the compensation light source and is configured to control operation of the compensation light source based on the intensity of the ambient light acquired by the detector module.

For example, in at least one embodiment of the present disclosure, the display panel comprises: embodiment of the present disclosure and an opposite substrate. The array substrate is provided with a pixel drive circuit layer; the opposite substrate is opposite to the array substrate, a black matrix is on a surface of the opposite substrate close to the array substrate, and an orthographic projection of the compensation light source on the opposite substrate is within an orthographic projection of the black matrix on the opposite substrate; a surface of the array substrate close to the opposite substrate is the reflection surface.

For example, in at least one embodiment of the present disclosure, the compensation light source comprises an electrode and a light-emitting layer. The electrode is connected with the processor module; and the light-emitting layer is connected with the electrode and is configured to emit light under a voltage provided by the electrode, the processor module is configured to control the voltage applied by the electrode to the light-emitting layer.

For example, in at least one embodiment of the present disclosure, the reflective-type display screen further comprises a polarization filter layer, a liquid crystal layer and a polarizer. The polarization filter layer is on a light-outputting surface of the light-emitting layer and configured to receive light emitted by the light-emitting layer; the liquid crystal layer is sandwiched between the array substrate and the opposite substrate and configured to receive light from the polarization filter layer; and the polarizer is on the light-outputting side of the display panel; the polarization filter layer, the liquid crystal layer, and the polarizer are configured to cooperate with each other, so that a phase of light which is emitted from the light-emitting layer and exits from the display panel after successively passing through the polarization filter layer, the liquid crystal layer, and the polarizer is consistent with a phase of ambient light which exits from the display panel after entering the display panel and then being reflected by the reflection surface.

For example, in at least one embodiment of the present disclosure, the compensation light source is on a side of the opposite substrate close to the array substrate and on a side of the black matrix close to the array substrate.

For example, in at least one embodiment of the present disclosure, the polarizer comprises: a polyvinyl alcohol resin (PVA) layer, and a $(n+\frac{1}{2})\lambda$ type polarizer; $\lambda$, is an average wavelength of white light emitted by the light-emitting layer, and n is a natural number; the polarization filter layer comprises: a polyvinyl alcohol resin (PVA) layer and a $(n+\frac{1}{2})\lambda$ type polarizer; the $(n+\frac{1}{2})\lambda$ type polarizer is at a side of the polyvinyl alcohol resin (PVA) layer of the polarization filter layer away from the light-emitting layer; light emitted by the light-emitting layer passes through the polyvinyl alcohol resin (PVA) layer of the polarization filter layer to obtain first linearly polarized light, and the first linearly polarized light passes through the $(n+\frac{1}{2})\lambda$ type polarizer of the polarization filter layer to obtain second linearly polarized light. Liquid crystal in the liquid crystal layer is configured that in the case where the liquid crystal is not driven, an included angle between a direction of an optical axis of the liquid crystal and a polarization direction of the second linearly polarized light is 45 degrees, and in the case where the liquid crystal is driven, the direction of the optical axis of the liquid crystal is perpendicular to the array substrate.

For example, in at least one embodiment of the present disclosure, the compensation light source is on a side of the array substrate close to the opposite substrate and on a side of the pixel drive circuit layer close to the opposite substrate.

For example, in at least one embodiment of the present disclosure, the polarizer comprises a polyvinyl alcohol resin (PVA) layer and a $(n+\frac{1}{2})\lambda$ type polarizer; $\lambda$, is an average wavelength of white light emitted by the light-emitting layer, and n is a natural number; the polarization filter layer comprises a polyvinyl alcohol resin (PVA) layer, a $(n+\frac{1}{2})\lambda$ type polarizer and a $(n+\frac{1}{4})\lambda$ type polarizer; the $(n+\frac{1}{2})\lambda$ type polarizer is on a side of the polyvinyl alcohol resin (PVA) layer of the polarization filter layer away from the light-emitting layer; the $(n+\frac{1}{4})\lambda$ type polarizer is on a side of the $(n+\frac{1}{2})\lambda$ type polarizer of the polarization filter layer away from the polyvinyl alcohol resin (PVA) layer of the polarization filter layer. Light emitted by the light-emitting layer passes through the polyvinyl alcohol resin (PVA) layer of the polarization filter layer to obtain first linearly polarized light, and the first linearly polarized light passes through the (n+½)λ type polarizer of the polarization filter layer to obtain second linearly polarized light; liquid crystal in the liquid crystal layer is configured that in the case where the liquid crystal is not driven, an included angle between a direction of an optical axis of the liquid crystal and a polarization direction of the second linearly polarized light is 45 degrees, and in the case where the liquid crystal is driven, the direction of the optical axis of the liquid crystal is perpendicular to the array substrate.

For example, in at least one embodiment of the present disclosure, the display panel comprises a plurality of pixels arranged in an array, each pixel of the plurality of pixels comprises a first sub-pixel, a second sub-pixel, and a third sub-pixel, and the compensation light source is in at least a part of pixels of the plurality of pixels.

For example, in at least one embodiment of the present disclosure, the light-emitting layer emits white light under control of the processor module, and no color filter layer is arranged on the opposite substrate.

For example, in at least one embodiment of the present disclosure, the compensation light source comprises a first compensation light source in the first sub-pixel, a second compensation light source in the second sub-pixel, and a third compensation light source in the third sub-pixel; the first compensation light source emits red light, the second compensation light source emits green light, and the third compensation light source emits blue light; a color filter layer is on the opposite substrate, the black matrix defines the color filter layer into a plurality of color units, each of the plurality of color units comprises a red sub-unit, a green sub-unit and a blue sub-unit, and the red sub-unit, the green sub-unit and the blue sub-unit are respectively in the first sub-pixel, the second sub-pixel and the third sub-pixel.

For example, in at least one embodiment of the present disclosure, the reflection surface as a whole is a curved surface concave toward a direction away from the opposite substrate.

For example, in at least one embodiment of the present disclosure, the reflection surface is provided with a plurality of protrusions.

For example, in at least one embodiment of the present disclosure, the plurality of protrusions are randomly arranged.

For example, in at least one embodiment of the present disclosure, the detector module comprises at least one photoelectric sensor unit, and the at least one photoelectric sensor unit is configured to convert the intensity of the ambient light into electrical signals.

For example, in at least one embodiment of the present disclosure, the processor module comprises an average value processor unit and a differential value processor unit. The average value processor unit is respectively connected with the at least one photoelectric sensor unit and is configured to perform average value processing on the electrical signals of the at least one photoelectric sensor unit and then output an average value of the electrical signals; and the differential value processor unit connected with the average value processor unit and configured to output a differential value electrical signal between the average value of the electrical signals and a reference electrical signal to the compensation light source.

For example, in at least one embodiment of the present disclosure, the reflective-type display screen further comprises a driver unit; the driver unit is connected with the display panel; and the driver unit, the average value processor unit and the differential value processor unit are integrated on a same circuit board.

At least one embodiment of the present disclosure further provides a display device, the display device comprises any one of the reflective-type display screens according provided by the embodiments of the present disclosure.

At least one embodiment of the present disclosure further provides a control method for any one of the reflective-type display screens according provided by the embodiments of the present disclosure. The control method comprises step one and step two. Step one: acquiring an intensity of ambient light outside the display screen; step two: controlling the compensation light source to be turned on or turned off according to the intensity of the ambient light.

For example, in at least one embodiment of the present disclosure, the second step comprises: converting the intensity of the ambient light into electrical signals; based on a difference between the electrical signals converted from the intensity of the ambient light and a reference electrical signal, determining a compensation electrical signal; and based on a positive value of or a negative value of the compensation electric signal, controlling the compensation light source to be turned on or turned off by the processor module, in which in a case where a value of the compensation electric signal is not greater than zero, the processor module turns off the compensation light source, and in a case where the value of the compensation electric signal is greater than zero, the processor module turns on the compensation light source.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
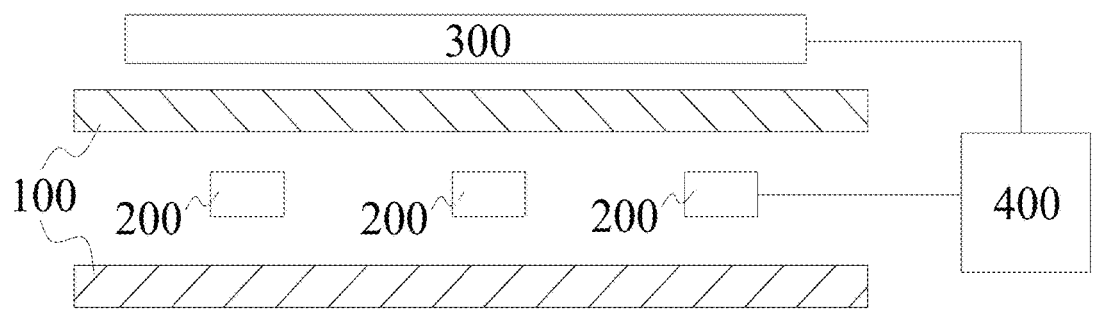
FIG. 1 is a schematic structural diagram of a reflective-type display screen according to an embodiment of the present disclosure.

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right," and the like are only used to indicate relative position relationship, and when the position of the described object is changed, the relative position relationship may be changed accordingly.

Unless otherwise specified, if the specific technology or conditions are not explicitly described in the following examples, those skilled in the art can follow the commonly used technology or conditions in the field or the product specifications.

At least one embodiment of the present disclosure provides a reflective-type display screen. The reflective-type display screen includes a display panel, a compensation light source, a detector module, and a processor module. The display panel comprises a reflection surface, the display panel is configured to reflect light by the reflection surface to realize display; the compensation light source is arranged in the display panel; the detector module is arranged on a light-outputting side of the display panel and is configured to acquire an intensity of ambient light outside the display screen; the processor module is respectively connected with the detector module and the compensation light source, and is configured to control operation of the compensation light source based on the intensity of the ambient light acquired by the detector module. The reflective-type display screen provided by at least one embodiment of the present disclosure can control the compensation light source to be turned on in the case where the ambient light intensity is weak, so as to achieve more uniform display effect of the reflective-type display screen in an energy-saving manner, thereby overcoming the dependence of the reflective-type display screen on ambient light and better adapting to different intensities of ambient light, and enabling the reflective-type display screen to have a better display effect even in the case where the intensity of ambient light is weak.

According to an embodiment of the present disclosure, referring to FIG. 1, the reflective-type display screen includes a display panel 100, a compensation light source 200, a detector module 300, and a processor module 400. The display panel 100 includes a reflection surface 1201, and the display panel 100 is configured to reflect light by the reflection surface 1201 to realize display compensation. The light includes ambient light outside the display panel 100, and may also include light emitted by the compensation light source 200. The detector module 300 is arranged on the light-outputting surface of the display panel 100 and configured to acquire the intensity of ambient light outside the display screen. The processor module 400 is connected, for example, electrically connected, with the detector module 300 and the compensation light source 200. The processor module 400 is configured to control the operation of the compensation light source 200 based on the intensity of ambient light acquired by the detector module 300, for example, to control the compensation light source 200 to be turned on or turned off and to control the intensity of light emitted by the compensation light source 200. In this way, according to the intensity of the ambient light obtained by the detector module 300, the processor module 400 can intelligently control the compensation of the compensation light source 200 for the ambient light, so that the uniform display effect of the reflective display screen is achieved in an energy-saving and environment-friendly manner, thereby overcoming the dependence of the reflective-type display screen on ambient light and better adapting to different intensities of ambient light, and enabling the reflective-type display screen to have a better display effect even in the case where the intensity of ambient light is weak.

Figure 2A:
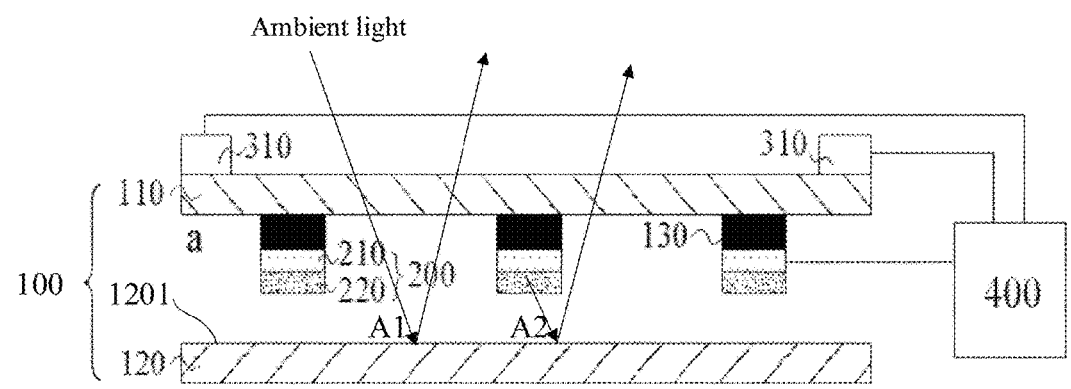
FIG. 2A is a schematic structural diagram of a reflective-type display screen according to another embodiment of the present disclosure.
Figure 2B:
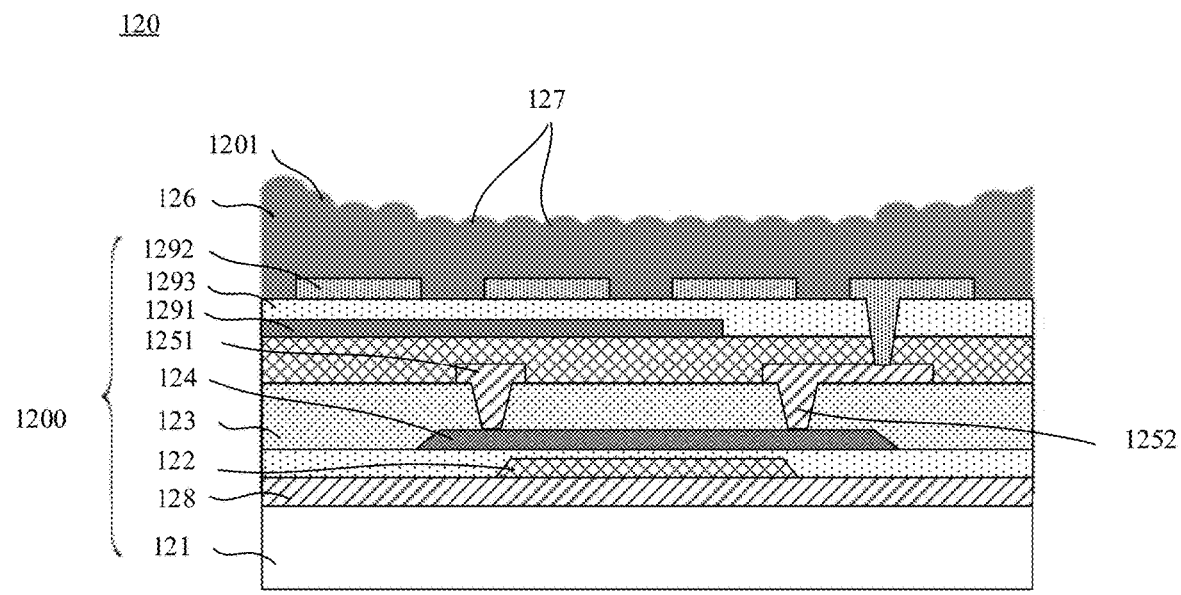
FIG. 2B is a schematic structural diagram of the array substrate illustrated in FIG. 2A.

In some embodiments of the present disclosure, referring to FIG. 2A-FIG. 2B, for example, the display panel 100 includes an opposite substrate 110 and an array substrate 120. The array substrate 120 is provided with a pixel drive circuit layer 1200. The opposite substrate 110 is opposite to the array substrate 120, and a black matrix 130 is arranged on a surface a of the opposite substrate 110 close to the array substrate 120. For example, referring to FIG. 2A and FIG. 3A, an orthographic projection of the compensation light source 200 on the opposite substrate 110 is within an orthographic projection of the black matrix 130 on the opposite substrate 110. In this way, the compensation light source 200 shielded by the black matrix 130 cannot affect the emission rate of ambient light. A surface of the array substrate 120 close to the opposite substrate 110 is a reflection surface 1201.

For example, in the embodiment as shown in FIG. 2A, the compensation light source 200 is arranged on a side of the opposite substrate 110 close to the array substrate 120. For example, the compensation light source 200 is located on a side of the black matrix 130 close to the array substrate 120, that is, the compensation light source 200 is arranged on a side of the black matrix 130 away from the opposite substrate 110. In this way, in the case where the compensation light source 200 is needed to compensate the ambient light, light A2 emitted by the compensation light source 200 arranged on a lower surface of the black matrix 130 is reflected by the reflection surface 1201 of the array substrate 120 close the opposite substrate 110 and then is outputted together with ambient light A1, thereby compensating the shortage of the ambient light and making the display effect of the reflective-type display screen more uniform.

Figure 3A:
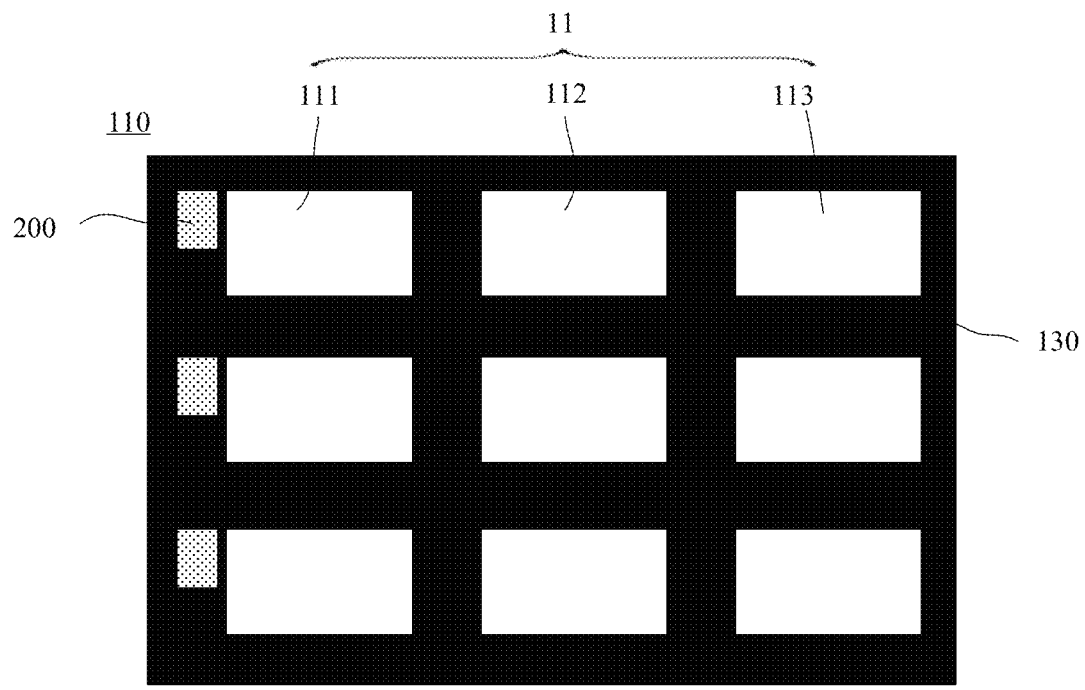
FIG. 3A is a schematic diagram of the positional relationship between a compensation light source and a black matrix according to an embodiment of the present disclosure.

For example, the display panel 100 includes a plurality of pixels distributed in an array. Each pixel of the plurality of pixels includes a first sub-pixel, a second sub-pixel, and a third sub-pixel. The compensation light source 200 is located in at least a part of pixels. (some pixels) of the plurality of pixels. For example, as shown in FIG. 3A, the black matrix 130 defines a plurality of units 11 on the opposite substrate, each unit including a first sub-unit 111, a second sub-unit 112, and a third sub-unit 113, the first sub-unit 111, the second sub-unit 112, and the third sub-unit 113 are respectively located in the first sub-pixel, the second sub-pixel, and the third sub-pixel. For example, the compensation light source 200 is located only in a part of pixels of the plurality of units 11. Or, the compensation light source 200 is located in each unit 11, for example, a plurality of compensation light sources 200 are respectively provided in each unit 11, as shown in FIG. 3A. Of course, the compensation light source 200 may be provided in the first sub-unit 111, the second sub-unit 112, and the third sub-unit 113 of at least portion units 11, that is, the compensation light source 200 include a first compensation light source located in the first sub-pixel, a second compensation light source located in the second sub-pixel and a third compensation light source located in the third sub-pixel. For example, in the whole display panel 100, the arrangement of a plurality of compensation light sources 200 is uniform, so as to obtain a more uniform light compensation effect in the whole display panel 100, and obtain a uniform display brightness when the light compensation is performed. The embodiments of the present disclosure do not specifically limit the arrangement mode and position of the compensation light sources 200.

In some embodiments of the present disclosure, referring to FIG. 2A, each of the compensation light source 200 may include an electrode 210 and a light-emitting layer 220. For example, the electrode 210 is arranged on a side of the black matrix 130 away from the opposite substrate 110, and the light-emitting layer 220 is connected with the electrode 210 and is configured to emit light under the voltage provided by the electrode 210. The electrode 210 is connected to the processor module 400, and the processor module 400 is configured to control the voltage applied by the electrode 210 to the light-emitting layer 220. In this way, in the case where the compensation light source 200 needs to compensate the ambient light, the processor module 400 gives an electrical signal to the electrode 210 and enables the light-emitting layer 220 (such as light-emitting diode LED material, etc.) to emit light, and the processor module 400 can control whether the light-emitting layer 220 emits light and the brightness of the light emitted by the light-emitting layer 220, thereby compensating the intensity of the ambient light.

For example, as shown in FIG. 3A, the light-emitting layer 220 emits white light under the control of the processor module 400, and no color filter layer is provided on the opposite substrate 110. For example, the first compensation light source, the second compensation light source, and the third compensation light source all emit white light. Under this case, the first sub-unit 111, the second sub-unit 112, and the third sub-unit 113 all emit white light. That is, under this case, the display panel 100 is a display panel that displays black images and white images.

For example, the compensation light source 200 may include a white light-emitting diode (LED) or other light source that can emit white light.

As shown in FIG. 2B, for example, in some embodiments, the reflection surface 1201 as a whole is a curved surface that is concave toward a direction away from the opposite substrate 110. In this way, the upper surface which is lower in the middle and higher around can make the array substrate 120 have a converging effect on light reflection, thereby further enhancing the reflection effect of the array substrate 120 on light and improving the utilization rate of ambient light. Under this case, the thickness of the liquid crystal layer 140 is not uniform. During the working process of the display panel, a voltage difference applied to a portion with a larger thickness of the liquid crystal layer 140 is larger than a voltage difference applied to a portion with a smaller thickness of the liquid crystal layer 140, so that the alignment of liquid crystal molecules at various positions of the liquid crystal layer 140, can be consistent. The specific voltage value can be designed by those skilled in the art as required.

The pixel drive circuit layer 1200 of the array substrate 120 includes a base substrate 121 and a thin film transistor arranged on the base substrate 121. The thin film transistor includes a gate electrode 122, a gate insulation layer 123, an active layer 124, a source electrode 1251, and a drain electrode 1252. For example, each sub-pixel includes a thin film transistor, and the sub-pixel is driven to work by the thin film transistor. The pixel drive circuit layer 1200 further includes a first insulation layer 126 (for example, a resin layer), a common electrode 1291, a pixel electrode 1292, and a second insulation layer 1293. The pixel electrode 1292 is electrically connected with the drain electrode 1252. The second insulation layer 1293 is located between the common electrode 1291 and the pixel electrode 1292 to insulate the common electrode 1291 and the pixel electrode 1292. A voltage difference between the common electrode 1291 and the pixel electrode 1292 controls the orientation of liquid crystal molecules in each sub-pixel and changes the direction of the optical axes of the liquid crystal molecules.

For example, in the embodiment as shown in FIG. 2B, the first insulation layer 126 is located on a side of the pixel drive circuit layer 1200 away from the base substrate 121 and covers the pixel drive circuit layer 1200.

For example, in the embodiment shown in FIG. 2B, a surface of the first insulation layer 126 away from the base substrate 121 is provided with a reflective metal layer to form the reflection surface. For example, the reflective metal layer is a white metal layer with a thickness of several hundred nanometers, such as a silver layer or an aluminum layer, so that the reflective effect of the array substrate 120 on light can be further enhanced. A surface of the first insulation layer 126 of each pixel unit on the array substrate 120 away from the base substrate 121 is recessed toward the base substrate 121.

For example, the reflection surface 1201 has a plurality of protrusions 127. According to the actual test, the plurality of protrusions 127 can make the reflection and convergence effect of the ambient light and the light emitted by the light-emitting layer 220 better, and can further enhance the overall reflection effect and improve the utilization rate of light.

For example, the plurality of protrusions 127 are randomly arranged, which is beneficial to increase the viewing angle of the reflective-type display screen.

Figure 4A:
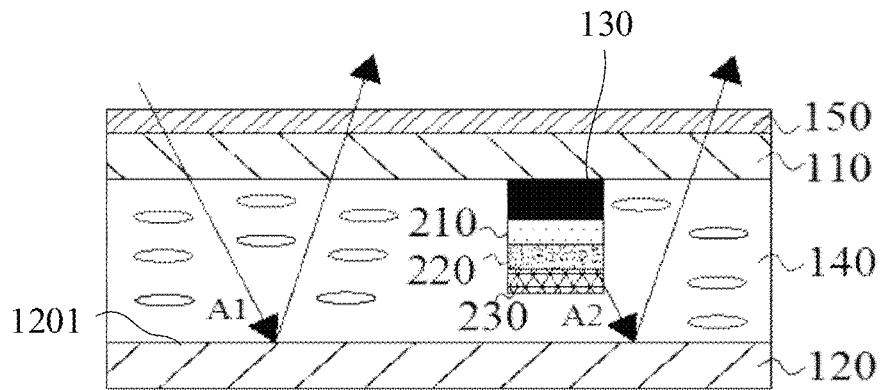
FIG. 4A is a schematic structural diagram of a portion of a reflective-type display screen according to another embodiment of the present disclosure.

In some specific examples, referring to FIG. 4A, for example, the reflective display screen further includes a polarization filter layer 230, a liquid crystal layer 140, and a polarizer 150. The polarization filter layer 230 is located on a light-outputting surface of the light-emitting layer 220 and is configured to receive light emitted by the light-emitting layer 220. For example, the light-emitting layer 220 and the electrode 210 are stacked in the direction perpendicular to the opposite substrate 110, and the polarization filter layer 230 is located on a side of the light-emitting layer 220 away from the electrode 210. The liquid crystal layer 140 is sandwiched between the array substrate 120 and the opposite substrate 110, and is configured to receive light from the polarization filter layer 230. The polarizer 150 is arranged on the light-outputting side of the display panel 100. The light emitted from the light-emitting layer 220 passes through the polarization filter layer 230 and the liquid crystal layer 140 in sequence, then enters the liquid crystal layer 140 again after being reflected by the reflection surface 1201, and then enters the polarizer 150 from the liquid crystal layer 140. The polarization filter layer 230, the polarizer 150, and the liquid crystal layer 140 are configured to make the phase of the light exiting the display panel 100 after passing through the polarizer 150 is consistent with the phase of ambient light exiting from the display panel 100 after entering the display panel 100 and being reflected by the reflection surface 1201. Therefore, the intensity of light emitted from the reflective-type display screen is enhanced, the display brightness is increased, and the compensation effect of the compensation light on the ambient light is ensured. In addition, the material of forming the polarization filter layer 230 is transparent and cannot cause light attenuation, thus ensuring the emission rate of compensation light.

For example, the polarizer 150 includes a polyvinyl alcohol resin (PVA) layer and an $(n+\frac{1}{2})\lambda$ type polarizer stacked with the polyvinyl alcohol resin (PVA) layer in a direction perpendicular to the opposite substrate 110. The polyvinyl alcohol resin (PVA) layer of polarizer 150 is located at a side of the $(n+\frac{1}{2})\lambda$ type polarizer of the polarizer 150 away from the opposite substrate 110. The $(n+\frac{1}{2})\lambda$ type polarizer is located on the opposite substrate 110, n is a natural number, and $\lambda$ is the average wavelength of white light emitted by the light-emitting layer.

Figure 4B:
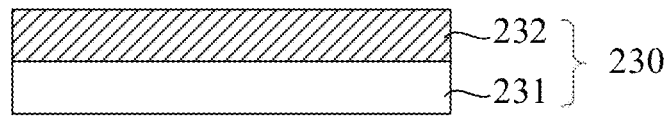
FIG. 4B is a schematic structural diagram of the polarization filter layer in FIG. 4A.

FIG. 4B is a schematic structural diagram of the polarization filter layer in FIG. 4A. As shown in FIG. 4B, the polarization filter layer 230 includes a polyvinyl alcohol resin (PVA) layer 231 and an $(n+\frac{1}{2})\lambda$ type polarizer 232. The $(n+\frac{1}{2})\lambda$ type polarizer 232 of the polarization filter layer 230 is stacked with the polyvinyl alcohol resin (PVA) layer of the polarization filter layer 230 in the direction perpendicular to the opposite substrate 110.

Figure 4C:
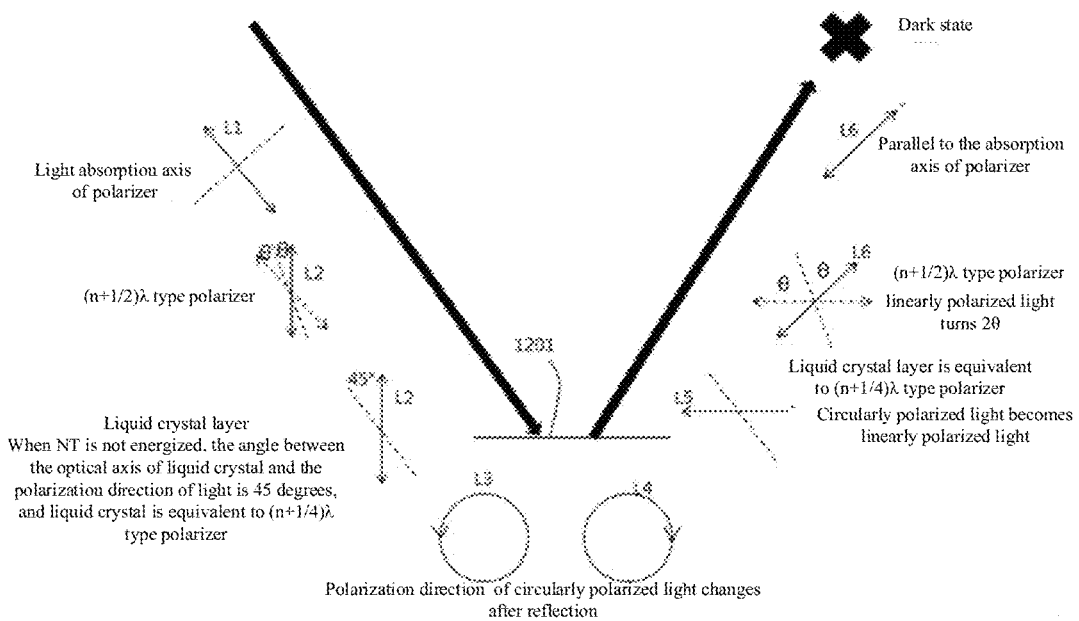
FIG. 4C is a schematic diagram of a matching process of a polarization filter layer, a liquid crystal layer, and a polarizer in a dark state.
Figure 4D:
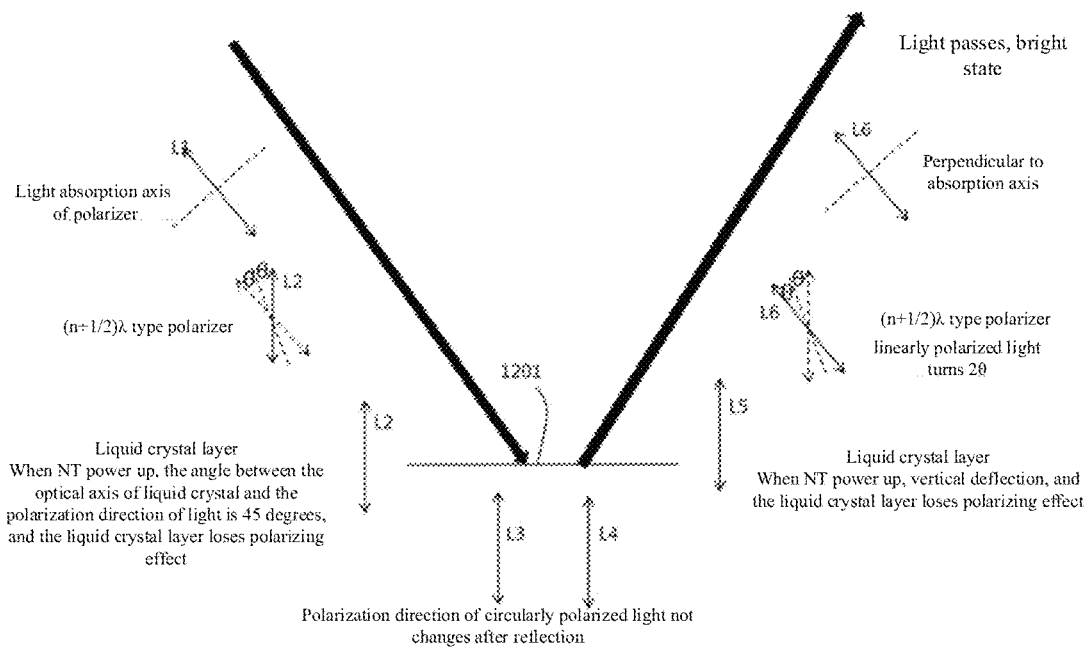
FIG. 4D is a schematic diagram of a matching process of a polarization filter layer, a liquid crystal layer, and a polarizer in a bright state.

FIG. 4C is a schematic diagram of the matching process of the polarization filter layer, the liquid crystal layer, and the polarizer in a dark state. FIG. 4D is a schematic diagram of the matching process of the polarization filter layer, the liquid crystal layer, and the polarizer in a bright state.

With reference to FIG. 4B and FIG. 4C, the light emitted by the light-emitting layer 220 first passes through the polyvinyl alcohol resin (PVA) layer 231 to obtain a first linearly polarized light L1, and the first linearly polarized light L1 passes through the $(n+\frac{1}{2})\lambda$ type polarizer 232 of the polarization filter layer 230 to obtain a second linearly polarized light L2. The second linearly polarized light L2 enters the liquid crystal layer 140, and the liquid crystal in the liquid crystal layer 140 is not driven in this case (that is, the voltage difference is not applied through the pixel electrode and the common electrode), and an included angle between the direction of the optical axis of liquid crystal and the polarization direction of the second linearly polarized light L2 is 45°. For example, the alignment of liquid crystal can be realized by a liquid crystal alignment layer. Therefore, due to the characteristics of the liquid crystal, the liquid crystal layer 140 serves as an $(n+\frac{1}{4})\lambda$ type polarizer, and the second linearly polarized light L2 passes through the liquid crystal layer 140 to obtain a first circularly polarized light L3. The first circularly polarized light L3 is reflected by the reflection surface 1201 to obtain a second circularly polarized light L4, and the polarization direction of the second circularly polarized light L4 is different from the polarization direction of the first circularly polarized light L3. The second circularly polarized light L4 enters the liquid crystal layer 140. Because the liquid crystal layer 140 serves as an $(n+\frac{1}{4})\lambda$ type polarizer, the liquid crystal layer 140 converts the second circularly polarized light L4 into a third linearly polarized light L5. Because the polarizer 150 includes an $(n+\frac{1}{2})\lambda$ type polarizer, the third linearly polarized light L5 passes through the polarizer 150, and finally a fourth linearly polarized light L6 is obtained. And the polarization direction of the fourth linearly polarized light L6 is parallel to the direction of the light absorption axis of the polarizer 150, so that the fourth linearly polarized light L6 cannot be emitted from the polarizer 150, thereby displaying a dark state.

With reference to FIG. 4B and FIG. 4D, the light emitted by the light-emitting layer 220 first passes through the polyvinyl alcohol resin (PVA) layer 231 to obtain a first linearly polarized light L1, and the first linearly polarized light L1 passes through the $(n+\frac{1}{2})\lambda$ type polarizer 232 of the polarization filter layer 230 to obtain a second linearly polarized light L2. The second linearly polarized light L2 enters the liquid crystal layer 140, and the liquid crystal in the liquid crystal layer 140 is driven in this case (that is, a voltage difference is applied through the pixel electrode and the common electrode) so that the direction of the optical axis of the liquid crystal is perpendicular to the array substrate. Therefore, due to the characteristics of the liquid crystal, the liquid crystal layer 140 does not change the polarization direction of the second linearly polarized light L2, and the second linearly polarized light L2 passes through the liquid crystal layer 140 to obtain a third linearly polarized light L3. The third linearly polarized light L3 is reflected by the reflection surface 1201 to obtain a fourth linearly polarized light L4, and the polarization direction of the fourth linearly polarized light L4 is the same as the polarization direction of the third linearly polarized light L3. The fourth linearly polarized light L4 enters the liquid crystal layer 140. Because the optical axis of the liquid crystal is perpendicular to the array substrate, the liquid crystal layer 140 does not change the polarization direction of the fourth linearly polarized light L4. After the liquid crystal layer 140 passing through the liquid crystal layer 140, a fifth linearly polarized light L5 is obtained, and the polarization direction of the fifth linearly polarized light L5 is the same as the polarization direction of the fourth linearly polarized light L4. Because the polarizer 150 includes an $(n+\frac{1}{2})\lambda$ type polarizer, the fifth linearly polarized light L5 passes through the polarizer 150, and finally a sixth linearly polarized light L6 is obtained, and the polarization direction of the sixth linearly polarized light L6 is perpendicular to the direction of the light absorption axis of the polarizer 150, so that the sixth linearly polarized light L6 can be output from the polarizer 150 to display a bright state.

The effect of the polarizer 150 and the liquid crystal layer 140 cooperating with each other on ambient light is similar to the above process. Therefore, the light emitted from the light-emitting layer 220 can pass through the polarization filter layer 230 and the liquid crystal layer 140 in sequence, and then enter the liquid crystal layer 140 again after being reflected by the reflection surface 1201, and then enter the polarizer 150 from the liquid crystal layer 140. The polarization filter layer 230, the polarizer 150, and the liquid crystal layer 140 are configured that the phase of light exiting from the display panel 100 after passing through the polarizer 150 is consistent with the phase of ambient light exiting from the display panel 100 after entering the display panel 100 and being reflected by the reflection surface 1201.

Figure 5:
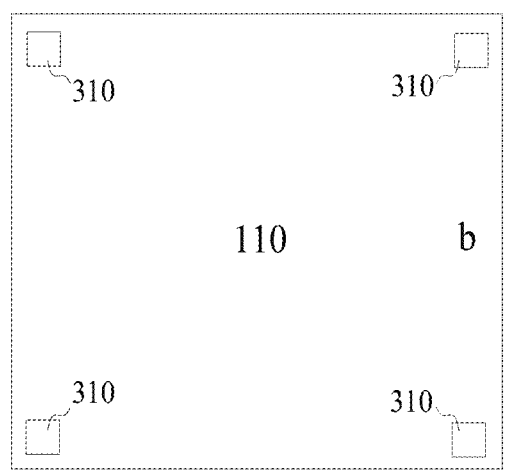
FIG. 5 is a schematic top view of the position distribution of electric sensing units according to an embodiment of the present disclosure.

For example, the detector module 300 includes at least one photoelectric sensor unit 310, and the least one photoelectric sensor unit 310 is configured to convert the intensity of ambient light into electrical signals, so that the detector module 300 composed of at least one photoelectric sensor unit 310 can convert the intensity of ambient light into electrical signals and transmit the electrical signals to the processor module 400. For example, in some embodiments of the present disclosure, referring to FIG. 5, the detector module 300 may include four photoelectric sensor units 310, and the four photoelectric sensor units 310 are respectively arranged at four top corners of a surface b of the opposite substrate 110 away from the array substrate 120, so that the intensity of ambient light of the light-outputting surface of the display panel can be fully obtained, and the compensation is more intelligent and energy-saving. The number of the photoelectric sensor units 310 is not limited to four, and the above is only an example, which is not limited by the present disclosure.

Figure 6:
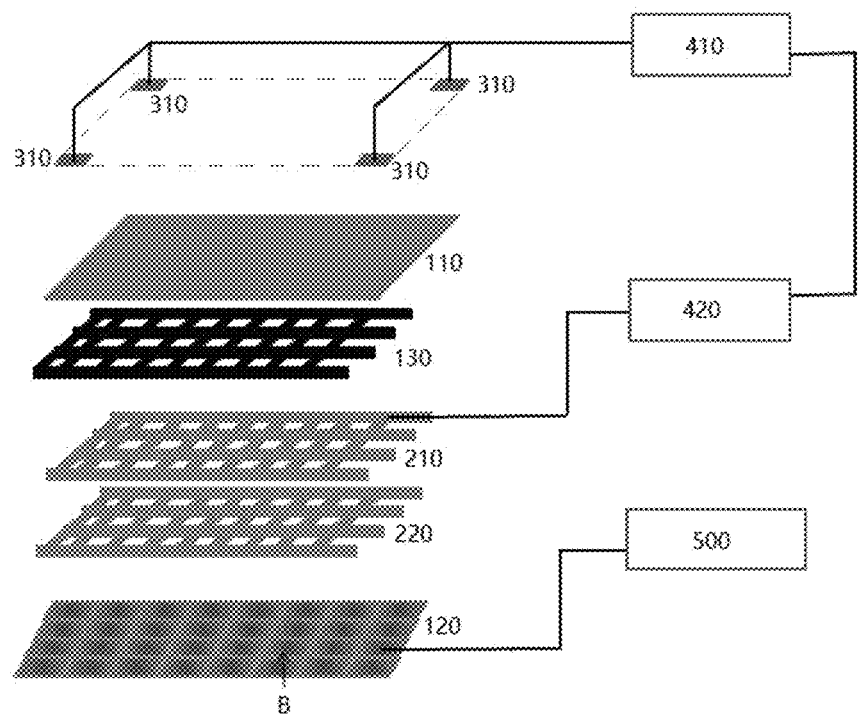
FIG. 6 is a schematic structural diagram of a reflective-type display screen according to another embodiment of the present disclosure.

In some embodiments of the present disclosure, referring to FIG. 6, the processor module 400 (not labeled in FIG. 6) may include an average value processor unit 410 and a differential value processor unit 420. The average value processor unit 410 is respectively connected with a plurality of photoelectric sensor units 310, and the average value processor unit 410 is configured to perform average value processing on the electrical signals of the plurality of photoelectric sensor units 310 and then output an average value of the electrical signals. The differential value processor unit 420 is connected with the average value processor unit 410, and is configured to output a differential value electrical signal between the average value of the electrical signals and a reference electrical signal to the compensation light source 200 (not marked in FIG. 6). Specifically, the differential value processor unit 420 can output the differential value electrical signal to the electrode 210 to drive the light-emitting layer 220 to emit light. In this way, through the average value processor unit 410 and the differential value processor unit 420, whether the ambient light needs to be compensated can be intelligently judged, according to the intensity of ambient light acquired by the plurality of photoelectric sensor units 310.

According to the embodiments of the present disclosure, the specific types of electrical signals are not particularly limited, such as current, voltage or power, etc. Those skilled in the art can select and design accordingly according to the specific materials of the light-emitting layer 220, and specifically, they can select a photoelectric sensor that can convert light intensity into a current, which is not described in detail here.

According to an embodiment of the present disclosure, referring to FIG. 6, the reflective-type display screen may further include a driver unit 500 connected to the display panel 100 (not labeled in FIG. 6) for driving the array substrate 120 to work, and the driver unit 500, the average value processor unit 410, and the differential value processor unit 420 may be integrated on a same circuit board. For example, the circuit board is located on a side of the array substrate 120 away from the light-outputting surface. In this way, the number of chips is not additionally increased, so that the reflective-type display screen is thinner and lighter.

For example, the processor module 400 may include a CPU, a logic circuit, etc. For example, the photoelectric sensor unit 310 is a photoelectric sensor. Those skilled in the art can select the specific types of the processor module 400 and the photoelectric sensor unit 310 with reference to the conventional technology in the art, which is not limited by the embodiments of the present disclosure.

Figure 3B:
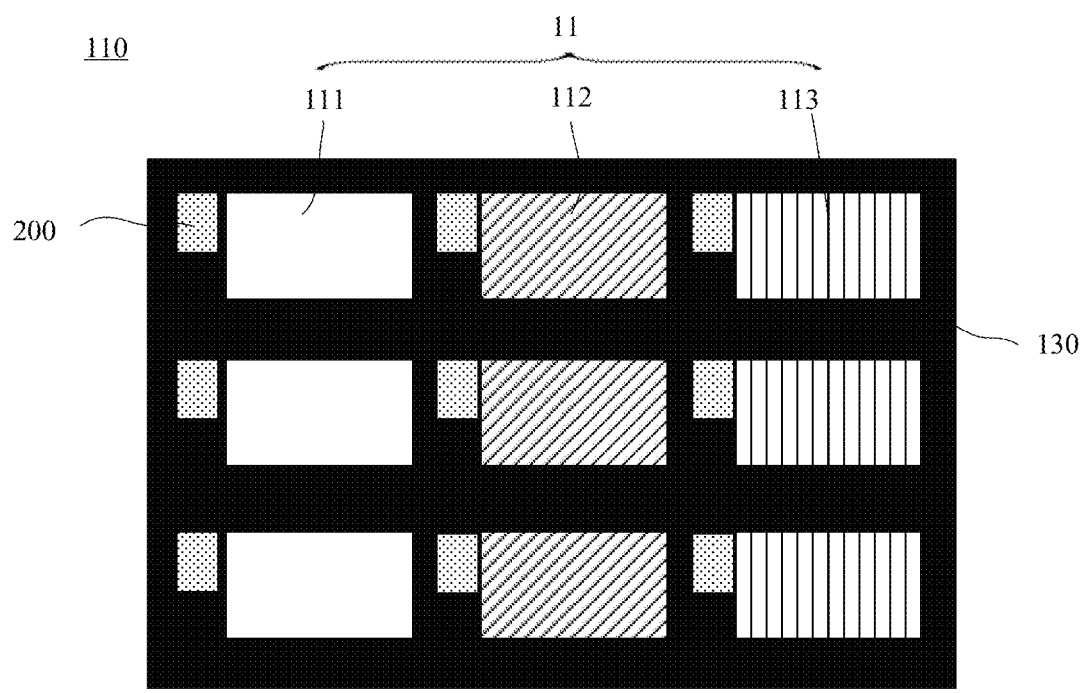
FIG. 3B is a schematic diagram of the positional relationship between a compensation light source and a black matrix according to another embodiment of the present disclosure.

In some embodiments, as shown in FIG. 3B, the compensation light source 200 include a first compensation light source in the first sub-unit 111, a second compensation light source in the second sub-unit 112, and a third compensation light source in the third sub-unit 113. For example, the first compensation light source emits red light, the second compensation light source emits green light, and the third compensation light source emits blue light. A color filter layer is arranged on the opposite substrate 110, and the black matrix 130 defines the color filter layer into a plurality of color units, and each of the plurality of color units includes a red sub-unit 111, a green sub-unit 112, and a blue sub-unit 113, and the red sub-unit 111, the green sub-unit 112, and the blue sub-unit 113 are located in the first sub-pixel, the second sub-pixel, and the third sub-pixel, respectively. In this case, the display panel 100 is a color display panel and can realize color display. The opposite substrate 110 is a color filter substrate.

For example, the first compensation light source includes a diode emitting red light, the second compensation light source includes a diode emitting green light, and the third compensation light source includes a diode emitting blue light.

Figure 7A:
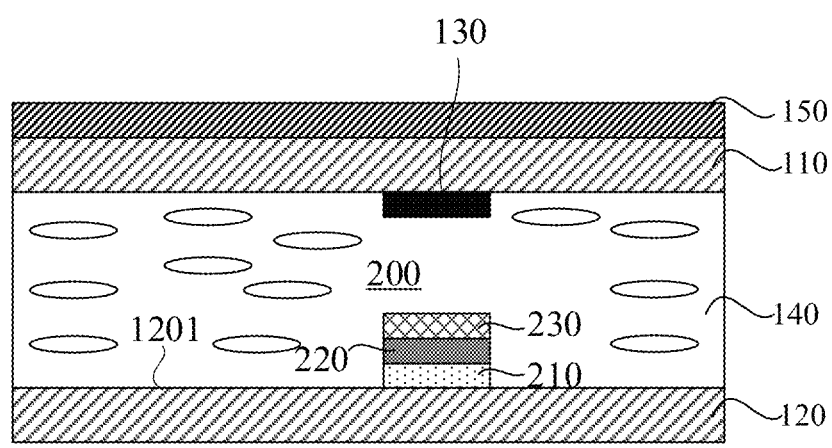
FIG. 7A is a schematic diagram of the positional relationship between a compensation light source and a black matrix according to another embodiment of the present disclosure.

In some embodiments, the compensation light source 200 may also be arranged on the array substrate 120. As shown in FIG. 7A, for example, the compensation light source 200 is arranged on a side of the array substrate 120 close to the opposite substrate 110 and on a side of the pixel drive circuit layer close to the opposite substrate.

The polarizer 150 includes a polyvinyl alcohol resin (PVA) layer and an $(n+\frac{1}{2})\lambda$ type polarizer $\lambda$ is the average wavelength of white light emitted by the light-emitting layer, and n is a natural number.

Figure 7B:
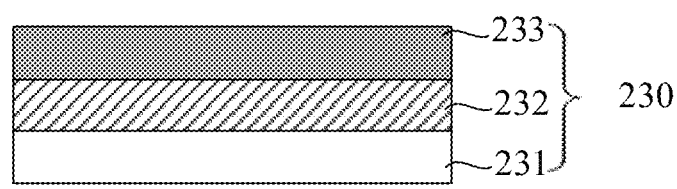
FIG. 7B is a schematic structural diagram of the polarization filter layer in FIG. 7A.

FIG. 7B is a schematic structural diagram of t the polarization filter layer in FIG. 7A. Referring to FIG. 7B and FIG. 7C, the polarization filter layer 230 includes a polyvinyl alcohol resin (PVA) layer 231, an $(n+\frac{1}{2})\lambda$ type polarizer 232, and an $(n+\frac{1}{4})\lambda$ type polarizer 233. The $(n+\frac{1}{2})\lambda$ type polarizer 232 is located on a side of the polyvinyl alcohol resin (PVA) layer 233 away from the light-emitting layer 220. The $(n+\frac{1}{4})\lambda$ type polarizer 233 is located on a side of the $(n+\frac{1}{2})\lambda$-type polarizer away from the PVA layer 231 of the polarization filter layer. The light emitted by the light-emitting layer 220 passes through the polyvinyl alcohol resin (PVA) layer 231 to obtain a first linearly polarized light, and the first linearly polarized light passes through the $(n+\frac{1}{2})\lambda$ polarizer 232 of the polarization filter layer to obtain a second linearly polarized light. The liquid crystal in the liquid crystal layer 140 is configured, in the case where the liquid crystal is not driven, the included angle between the direction of the optical axis of the liquid crystal and the polarization direction of the second linearly polarized light is 45 degrees. Under this case, after the second linearly polarized light passes through the liquid crystal layer 140 and the polarizer 150 in sequence, a third linearly polarized light is finally obtained, and the polarization direction of the third linearly polarized light is parallel to the direction of the light absorption axis of the polarizer 150, so that the third linearly polarized light cannot be emitted from the polarizer 150, thereby displaying a dark state.

In the case where the liquid crystal in the liquid crystal layer 140 is driven, the direction of the optical axis of the liquid crystal is perpendicular to the array substrate. Under this case, the light emitted from the light-emitting layer 220 passes through the polyvinyl alcohol resin (PVA) layer 231 to obtain a first linearly polarized light, and the first linearly polarized light passes through the (n+½)λ type polarizer 232 of the polarization filter layer to obtain a second linearly polarized light. After the second linearly polarized light passes through the liquid crystal layer 140 and the polarizer 150 in sequence, a third linearly polarized light is finally obtained, and the polarization direction of the third linearly polarized light is perpendicular to the direction of the light absorption axis of the polarizer 150, so that the third linearly polarized light can be emitted from the polarizer 150, thereby displaying a bright state. In this case, the phase of the light emitted from the light-emitting layer 220 passing through the polarization filter layer 230, the liquid crystal layer 140 and the polarizer 150 and exiting the display panel 100 can be consistent with the phase of the ambient light entering the display panel 100 and exiting the display panel 100 after being reflected by the reflection surface 1201.

Other features and corresponding technical effects of the embodiment as shown in FIG. 7A are the same as those of the embodiment shown in FIG. 4A, and please refer to the previous description and will not repeated.

To sum up, at least one embodiment of the present disclosure provides a reflective-type display screen. According to the intensity of the ambient light obtained by the detector module 300, the processor module 400 can intelligently control the compensation of the compensation light source 200 for the ambient light, so that the uniform display effect of the reflective display screen is achieved in an energy-saving and environment-friendly manner, thereby overcoming the dependence of the reflective-type display screen on ambient light and better adapting to different intensities of ambient light, and enabling the reflective-type display screen to have a better display effect even in the case where the intensity of ambient light is weak.

At least one embodiment of the present disclosure also provides a display device. The display device comprises any one of reflective-type display screens described above. The display device is changed into a reflective-type display device. For example, the display device is a reflective-type liquid crystal display device or other types of reflective-type display devices, which is not limited by embodiments of the present disclosure.

The structure, functions and technical effects of the display device provided by the embodiments of the present disclosure can refer to the corresponding descriptions in the display substrate provided by the embodiments of the present disclosure, and are not described in detail here.

For example, the display device provided by at least one embodiment of the present disclosure can be any product or component with display function, such as a display panel, electronic paper, mobile phone, tablet computer, television, display, notebook computer, digital photo frame, navigator, etc. The embodiments of the present disclosure is not limited to this.

According to the embodiments of the present disclosure, the specific type of the display device is not particularly limited, such as an electronic label, a small game machine or a smart watch, etc. Those skilled in the art can make corresponding choices according to the actual use requirements of the display device, and are not repeated here. It should be noted that besides the reflective-type display screen, the display device also includes other necessary components and structures, taking the electronic label as an example, such as a housing, a control circuit board or a power cord, etc., which can be supplemented by those skilled in the art according to the functions of the display device, and will not be described in detail here.

At least one embodiment of the disclosure also provides a control method suitable for the reflective-type display screen provided by the embodiments of the present disclosure. The control method includes a step one and a step two. Step one: acquiring an intensity of ambient light outside the display screen. Step two: controlling the compensation light source to be turned on or turned off according to the intensity of the ambient light.

Figure 8:
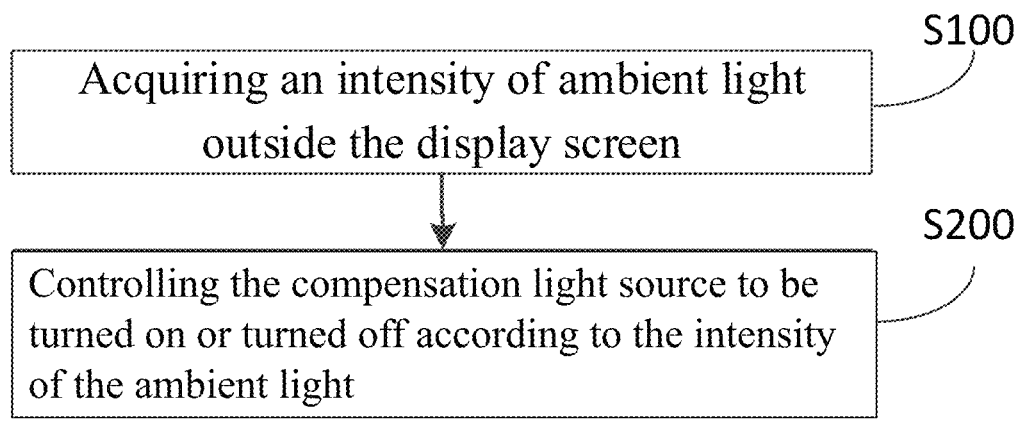
FIG. 8 is a flowchart of a control method of a reflective-type display screen according to an embodiment of the present disclosure.

Referring to FIG. 8, the control method includes the following step S100 and S200.

S100: acquiring an intensity of ambient light outside the display screen.

In this step, the intensity of ambient light outside the reflective-type display screen is acquired by the detector module 300 arranged on the light-outputting surface of the display panel 100. In some embodiments of the present disclosure, the detector module 300 may include at least one photoelectric sensor unit 310, and the at least one photoelectric sensor unit 310 is configured to convert the intensity of ambient light into electrical signals, and the specific types of electrical signals are not particularly limited, such as current, voltage or power, etc., and those skilled in the art may select different types of the at least one photoelectric sensor unit 310.

S200: controlling the compensation light source to be turned on or turned off according to the intensity of the ambient light.

In this step, based on the intensity (that is, light intensity) of the ambient light outside the reflective-type display screen acquired in step S100, the compensation light source 200 can be controlled to turn on or turn off. According to the embodiments of the present disclosure, the standard for judging whether the ambient light needs to be compensated by the compensation light source 200 can be set and adjusted by those skilled in the art according to the actual use environment. In some embodiments of the present disclosure, step S200 may further include the following steps.

S210: based on a difference between the electrical signals converted from the light intensity of the reflective-type display screen and a reference electrical signal, determining a compensation electrical signal.

In this step, the processor module 400 compares the electrical signals provided by the detector module 300 in step S100 with the reference electrical signal, and then judges whether it is necessary to control the compensation light source 200 to compensate the ambient light according to a positive value of and a negative value of difference between the electrical signals and the reference electrical signal. According to the embodiments of the present disclosure, referring to the specific value of the electrical signal, such as the actual value of the reference current, those skilled in the art can take the current value corresponding to the light intensity required for the best display of the reflective-type display screen as a reference current value.

In some embodiments of the present disclosure, the electrical signals provided by the plurality of photoelectric sensor units 310 in step S100 may all be provided to an average value processor unit 410 for average value processing, and the average value processor unit 410 provides the average value of the electrical signals as an ambient light average value to a differential value unit 420, and the differential value processor unit 420 is configured to compare the average value of the electrical signals with a reference electrical signal, so that a compensated electrical signal can be obtained.

S220: based on a positive value of or a negative value of the compensation electric signal, controlling the compensation light source to be turned on or turned off.

In this step, the compensation light source is controlled to be turned on or turned off based on the positive value or the negative value of the compensation electric signal obtained in step S210. In the case where the compensation electric signal is not greater than zero, the ambient light is strong and does not need compensation, and the processor module turns off the compensation light source. In the case where the compensation electric signal is greater than zero, the ambient light is weak, and the processor module turns on the compensation light source. Specifically, the differential value processor unit 420 can compensate the electric signals to the electrode 210 and make the light-emitting layer 220 emit light with corresponding intensity, so that the combination of ambient light and compensation light makes the reflective display screen show the best display effect.

To sum up, the control method provided by the embodiments of the present disclosure can control the compensation light source to be turned on in the case where the intensity of ambient light is weak, so as to achieve more uniform display effect of the reflective-type display screen in an energy-saving manner, thereby overcoming the dependence of the reflective-type display screen on ambient light and better adapting to different intensities of ambient light, and enabling the reflective-type display screen to have a better display effect even in the case where the intensity of ambient light is weak.

The above are merely specific implementations of the present disclosure without limiting the protection scope of the present disclosure thereto. The protection scope of the present disclosure should be based on the protection scope of the appended claims.

What is claimed is:

1. A reflective-type display screen, comprising:
a display panel comprising a reflection surface, wherein the display panel is configured to reflect light by the reflection surface to realize display;
a compensation light source in the display panel;
a detector module on a light-outputting side of the display panel and configured to acquire an intensity of ambient light outside the display screen;
a processor module respectively connected with the detector module and the compensation light source and configured to control operation of the compensation light source based on the intensity of the ambient light acquired by the detector module;
the display panel comprises:
an array substrate provided with a pixel drive circuit layer; and
an opposite substrate opposite to the array substrate, wherein a black matrix is on a surface of the opposite substrate close to the array substrate, and an orthographic projection of the compensation light source on the opposite substrate is within an orthographic projection of the black matrix on the opposite substrate;
a surface of the array substrate close to the opposite substrate is the reflection surface;

the compensation light source comprises:
an electrode connected with the processor module; and
a light-emitting layer connected with the electrode and configured to emit light under a voltage provided by the electrode, wherein the processor module is configured to control the voltage applied by the electrode to the light-emitting layer;
the reflective-type display screen further comprises:
a polarization filter layer on a light-outputting surface of the light-emitting layer and configured to receive light emitted by the light-emitting layer;
a liquid crystal layer sandwiched between the array substrate and the opposite substrate and configured to receive light from the polarization filter layer; and
a polarizer on the light-outputting side of the display panel, wherein the polarization filter layer, the liquid crystal layer, and the polarizer are configured to cooperate with each other, so that a phase of light which is emitted from the light-emitting layer and exits from the display panel after successively passing through the polarization filter layer, the liquid crystal layer, and the polarizer is consistent with a phase of ambient light which exits from the display panel after entering the display panel and then being reflected by the reflection surface, wherein
the compensation light source is on a side of the opposite substrate close to the array substrate and on a side of the black matrix close to the array substrate;
the polarizer comprises:
a polyvinyl alcohol resin (PVA) layer; and
a $(n+\frac{1}{2})\lambda$ type polarizer, wherein $\lambda$ is an average wavelength of white light emitted by the light-emitting layer, and n is a natural number;
the polarization filter layer comprises:
a polyvinyl alcohol resin (PVA) layer; and
a $(n+\frac{1}{2})\lambda$ type polarizer at a side of the polyvinyl alcohol resin (PVA) layer of the polarization filter layer away from the light-emitting layer, wherein
light emitted by the light-emitting layer passes through the polyvinyl alcohol resin (PVA) layer of the polarization filter layer to obtain first linearly polarized light, and the first linearly polarized light passes through the $(n+\frac{1}{2})\lambda$ type polarizer of the polarization filter layer to obtain second linearly polarized light,
liquid crystal in the liquid crystal layer is configured that in a case where the liquid crystal is not driven, an included angle between a direction of an optical axis of the liquid crystal and a polarization direction of the second linearly polarized light is 45 degrees, and in a case where the liquid crystal is driven, the direction of the optical axis of the liquid crystal is perpendicular to the array substrate.

2. The reflective-type display screen according to claim 1, wherein the display panel comprises a plurality of pixels arranged in an array, each pixel of the plurality of pixels comprises a first sub-pixel, a second sub-pixel, and a third sub-pixel, and the compensation light source is in at least a part of pixels of the plurality of pixels.

3. The reflective-type display screen according to claim 2, wherein the compensation light source comprises a first compensation light source in the first sub-pixel, a second compensation light source in the second sub-pixel, and a third compensation light source in the third sub-pixel;
the first compensation light source emits red light, the second compensation light source emits green light, and the third compensation light source emits blue light;
a color filter layer is on the opposite substrate, the black matrix defines the color filter layer into a plurality of color units, each of the plurality of color units comprises a red sub-unit, a green sub-unit and a blue sub-unit, and the red sub-unit, the green sub-unit and the blue sub-unit are respectively in the first sub-pixel, the second sub-pixel and the third sub-pixel.

4. The reflective-type display screen according to claim 1, wherein the light-emitting layer emits white light under control of the processor module, and no color filter layer is arranged on the opposite substrate.

5. The reflective-type display screen according to claim 1, wherein the reflection surface as a whole is a curved surface concave toward a direction away from the opposite substrate.

6. The reflective-type display screen according to claim 5, wherein the reflection surface is provided with a plurality of protrusions.

7. The reflective-type display screen according to claim 6, wherein the plurality of protrusions are in an uneven arrangement.

8. The reflective-type display screen according to claim 1, wherein the detector module comprises at least one photoelectric sensor unit, and the at least one photoelectric sensor unit is configured to convert the intensity of the ambient light into electrical signals.

9. The reflective-type display screen according to claim 8, wherein the processor module comprises:
an average value processor unit respectively connected with the at least one photoelectric sensor unit and configured to perform average value processing on the electrical signals of the at least one photoelectric sensor unit and then output an average value of the electrical signals; and
a differential value processor unit connected with the average value processor unit and configured to output a differential value electrical signal between the average value of the electrical signals and a reference electrical signal to the compensation light source.

10. The reflective-type display screen according to claim 9, further comprising:
a driver unit connected with the display panel, wherein the driver unit, the average value processor unit and the differential value processor unit are integrated on a same circuit board.

11. A display device, comprising the reflective-type display screen according to claim 1.

12. A control method of the reflective-type display screen according to claim 1, comprising:
step one: acquiring the intensity of the ambient light outside the display screen; and
step two: controlling the compensation light source to be turned on or turned off, or controlling an intensity of light from the compensation light source, according to the intensity of the ambient light.

13. The control method according to claim 12, wherein the step two comprises:
converting the intensity of the ambient light into electrical signals;
based on a difference between the electrical signals converted from the intensity of the ambient light and a reference electrical signal, determining a compensation electrical signal; and
based on a positive value of or a negative value of the compensation electric signal, controlling the compensation light source to be turned on or turned off by the processor module, wherein
in a case where a value of the compensation electric signal is not greater than zero, the processor module turns off the compensation light source, and in a case where the value of the compensation electric signal is greater than zero, the processor module turns on the compensation light source.

14. A reflective-type display screen, comprising:
a display panel comprising a reflection surface, wherein the display panel is configured to reflect light by the reflection surface to realize display;
a compensation light source in the display panel;
a detector module on a light-outputting side of the display panel and configured to acquire an intensity of ambient light outside the display screen; and
a processor module respectively connected with the detector module and the compensation light source and configured to control operation of the compensation light source based on the intensity of the ambient light acquired by the detector module, wherein
the display panel comprises:
an array substrate provided with a pixel drive circuit layer; and
an opposite substrate opposite to the array substrate, wherein a black matrix is on a surface of the opposite substrate close to the array substrate, and an orthographic projection of the compensation light source on the opposite substrate is within an orthographic projection of the black matrix on the opposite substrate,
a surface of the array substrate close to the opposite substrate is the reflection surface;
the compensation light source comprises:
an electrode connected with the processor module; and
a light-emitting layer connected with the electrode and configured to emit light under a voltage provided by the electrode, wherein the processor module is configured to control the voltage applied by the electrode to the light-emitting layer;
the reflective-type display screen further comprises:
a polarization filter layer on a light-outputting surface of the light-emitting layer and configured to receive light emitted by the light-emitting layer;
a liquid crystal layer sandwiched between the array substrate and the opposite substrate and configured to receive light from the polarization filter layer; and
a polarizer on the light-outputting side of the display panel, wherein the polarization filter layer, the liquid crystal layer, and the polarizer are configured to cooperate with each other, so that a phase of light which is emitted from the light-emitting layer and exits from the display panel after successively passing through the polarization filter layer, the liquid crystal layer, and the polarizer is consistent with a phase of ambient light which exits from the display panel after entering the display panel and then being reflected by the reflection surface;
the compensation light source is on a side of the array substrate close to the opposite substrate and on a side of the pixel drive circuit layer close to the opposite substrate;
the polarizer comprises:
a polyvinyl alcohol resin (PVA) layer; and
a $(n+\frac{1}{2})\lambda$ type polarizer, wherein $\lambda$ is an average wavelength of white light emitted by the light-emitting layer, and n is a natural number;
the polarization filter layer comprises:
a polyvinyl alcohol resin (PVA) layer;
a $(n+\frac{1}{2})\lambda$ type polarizer on a side of the polyvinyl alcohol resin (PVA) layer of the polarization filter layer away from the light-emitting layer; and a $(n+\frac{1}{4})\lambda$ type polarizer on a side of the $(n+\frac{1}{2})\lambda$ type polarizer of the polarization filter layer away from the polyvinyl alcohol resin (PVA) layer of the polarization filter layer, wherein light emitted by the light-emitting layer passes through the polyvinyl alcohol resin (PVA) layer of the polarization filter layer to obtain first linearly polarized light, and the first linearly polarized light passes through the $(n+\frac{1}{2})\lambda$ type polarizer of the polarization filter layer to obtain second linearly polarized light, liquid crystal in the liquid crystal layer is configured that in a case where the liquid crystal is not driven, an included angle between a direction of an optical axis of the liquid crystal and a polarization direction of the second linearly polarized light is 45 degrees, and in a case where the liquid crystal is driven, the direction of the optical axis of the liquid crystal is perpendicular to the array substrate.

\* \* \* \* \*